March 24, 1970 G. E. LIGHTNER 3,502,413
APPARATUS FOR PRODUCING A DISPLAY OF THE TRANSMISSION
OR REFLECTION CHARACTERISTICS OF A SAMPLE BY
COMPARISON WITH A STANDARD
Filed Dec. 23, 1965 3 Sheets-Sheet 1
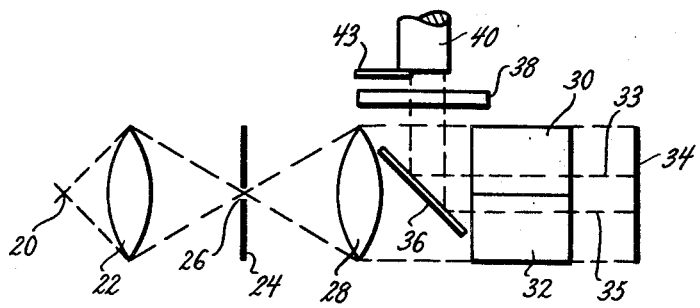
FIG. 1.
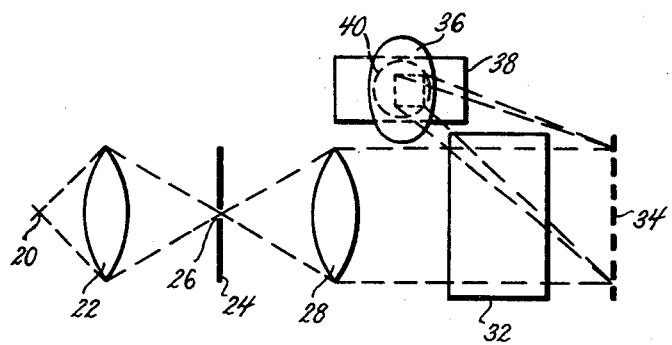
FIG. 2.
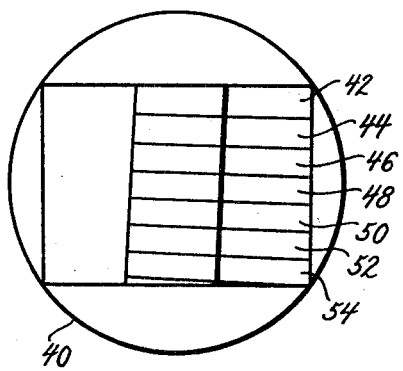
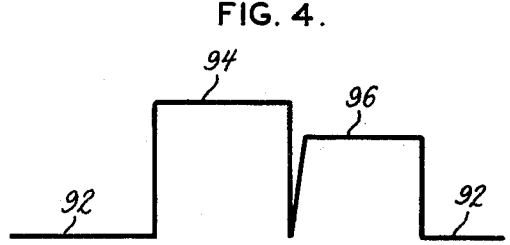
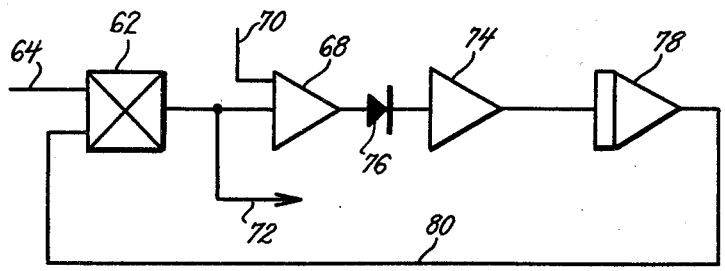

March 24, 1970     G. E. LIGHTNER     3,502,413
APPARATUS FOR PRODUCING A DISPLAY OF THE TRANSMISSION
OR REFLECTION CHARACTERISTICS OF A SAMPLE BY
COMPARISON WITH A STANDARD
Filed Dec. 23, 1965     3 Sheets-Sheet 2

United States Patent Office 3,502,413
Patented Mar. 24, 1970

3,502,413
APPARATUS FOR PRODUCING A DISPLAY OF THE TRANSMISSION OR REFLECTION CHARACTERISTICS OF A SAMPLE BY COMPARISON WITH A STANDARD
Gene E. Lightner, University City, Mo. (R.D. 1, Unionville Road, Kennett Square, Pa. 19348)
Filed Dec. 23, 1965, Ser. No. 515,963
Int. Cl. G01j *3/42;* G01n *21/22, 21/48*
U.S. Cl. 356—84                                    19 Claims

ABSTRACT OF THE DISCLOSURE

A sampled data control system has a read out on which it establishes and displays a voltage-fixed dark level line which can be considered to represent a zero percent transmission or reflection level, establishes and displays a voltage-fixed reference line which can be considered to represent a one hundred percent transmission or reflection level, and displays an intermediate trace which represents the spectrum of the radiation transmitted through or reflected from a sample.

---

Figure 6:
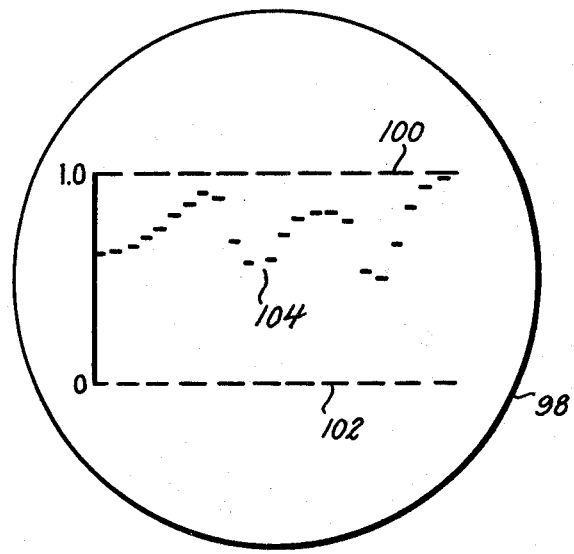

This invention relates to improvements in sampled data control systems. More particularly, this invention relates to improvements in sampled data control systems which can sense two different values, which can compute the ratios of those values, and which can provide readily usable displays representing those ratios.

It is, therefore, an object of the present invention to provide a sampled data control system which can sense two different values, which can compute the ratios of those values, and which can provide a readily usable display representing those ratios.

The sampled data control system provided by the present invention includes a sensor which senses two values to produce two signals that may be different; and those signals constitute input signals for the electronic circuit of that control system. That electronic circuit has an electronically variable means which can respond to one of those input signals to rapidly adjust the ratio of the output to the input of that electronic circuit to a value which will provide an ouput signal, caused by that one input signal, that has a substantially-fixed level; and that electronically variable means will hold that ratio at that value until the second of those input signals has been applied to that electronic circuit to cause that electronic circuit to provide a second output signal. The quiescent levels of the input signals will be essentially fixed; and the second output signal will bear to the first output signal substantially the same proportion which the second of those input signals bears to the first of those input signals. Those output signals will be applied to a read out; and that read out will provide displays that correctly indicate the ratio between the said input signals. The electronically variable means of the control circuit recurrently adjusts the ratio of the output to the input of that elecronic circuit to recurrently hold the output signals, caused by the one input signals, at the said substantially-fixed level; and hence that electronically variable means renders the output signals of the electronic circuit substantially insensitive to changes in line voltage, to amplifier drift, and to shifts in sensitivity of the sensor and of the read out. As a result, the displays which the read out provides in response to the output signals of the electronic circuit are reliable and readily usable. It is, therefore, an object of the present invention to provide a control system that includes a sensor which senses two values to provide two input signals, that includes an electronic circuit with an electronically variable means that can respond to one of those input signals to rapidly adjust the ratio of the output to the input of that electronic circuit to a value level which will provide an output signal, caused by that one input signal, that has a substantially-fixed level, and that will hold that ratio at that value until the second of those input signals has been applied to that electronic circuit to cause that electronic circuit to provide a second output signal, and that includes a read out which will provide displays corresponding to those output signals.

The control system provided by the present invention can be used to precisely and accurately sense values of various kinds, but that control system is particularly well adapted to the precise and accurate sensing of spectra. As a result, the control system provided by the present invention can readily be used in the art of spectrophotometry. This is desirable, because it is frequently important to quantitatively measure the spectrum of a sample, and that measuring is conveniently effected by use of a spectrophotometer. It is therefore, an object of the present invention to provide a control system which can precisely and accurately sense spectra.

In the art of spectrophotometry, it is desirable to provide a source of radiation for a sample, to use radiation from that source to form one spectrum, to pass radiation from that source through or to reflect that radiation from that sample to form a second spectrum, and finally to compare those spectra. While spectrophotometers have been proposed to perform these steps, some of those spectrophotometers have used electro-mechanical servo mechanisms, and the use of those electro-mechanical servo mechanisms have made those spectrophotometers slow in operation. Other of those spectrophotometers have used cathode ray tubes as sensors; and, while those spectrophotometers were rapid in operation, the data provided by those spectrophotometers was not precise. In the first place, the electronic circuits fed by those cathode ray tube sensors did not compensate for the low sensitivities of those sensors, or for the spectral energy distribution of the radiation sources, at the upper and lower radiation frequency limits. In the second place, variations in line voltage changed the temperatures, and thus the spectral energy distribution, of the radiation sources for those spectrophotometers. In the third place, sizable changes in ambient temperature changed the temperatures, and thus the spectral energy distribution, of those radiation sources. In the fourth place, the ability of the cathode ray tube sensors of those spectrophotometers to sense the radiation values of the spectra changed as those sensors aged; and, in the fifth place, the electrical conductivities of those cathode ray tube sensors changed as the temperatures of those sensors changed. As a result, the previously proposed spectrophotometers that used cathode ray tube sensors have been subject to distortion due to uncontrolled drift; and hence those spectrophotometers were of only limited value. It would be desirable to provide a spectrophotometer which could provide the rapid operation that is attainable by the use of a cathode ray tube sensor but which would compensate for the low sensitivities of those sensors, and of the spectral energy distribution of the radiation sources, at the upper and lower radiation frequency limits, and which also would be substantially free from distortion due to drift. The present invention provides such a spectrophotometer; and it is, therefore, an object of the present invention to provide a spectrophotometer that will compensate for the low sensitivities of those sensors, and of the spectral energy distribution of the radiation sources, at the upper and lower radiation frequency limits, and which also will be rapid in operation but that will be substantially completely free from distortion due to drift.

The control system provided by the present invention has an electronically scanned read out; and it establishes and displays a fixed-amplitude dark level line, on that electronically scanned read out, which can be considered to represent a zero percent transmission or reflection level. That control system also uses the spectrum of the radiation source to establish and display on that electronically scanned read out a reference line of constant amplitude; and that line can be considered to represent a one hundred percent transmission or reflection level. In addition, that control system uses the spectrum of the radiation transmitted through or reflected from the sample to establish and display on that electronically scanned read out a trace which is intermediate the dark level line and the reference line; and the relative value of any point on that trace can easily be sensed by gauging the position of that point relative to the dark level line and the reference line. It is, therefore, an object of the present invention to provide a control system which has an electronically scanned read out; and which establishes and displays on that electronically scanned read out a fixed-amplitude dark level line which can be considered to represent a zero percent transmission or reflection level, a reference line of constant amplitude which can be considered to represent a one hundred percent transmission or reflection level, and an intermediate trace which represents the spectrum of the radiation transmitted through or reflected from a sample.

The control system provided by the present invention has an electronically scanned pick up; and it establishes the said reference line of constant amplitude by taking the electrical signal, which the spectrum of the source of radiation causes that electronically scanned pick up to develop, and adjusting the amplitude of that signal to a constant, predetermined level. The amplitude of the signal developed by that electronically scanned pick up can vary considerably, but the control system provided by the present invention will promptly and precisely adjust that amplitude to the said constant, predetermined level. As the control system of the present invention adjusts the amplitude of that signal, it will proportionately adjust the amplitude of the signal which the spectrum of the radiation transmitted through or reflected from the specimen causes the electronically scanned pick up to develop; and that adjusted-amplitude sample signal will be displayed on the electronically scanned read out of the control system as a trace intermediate the fixed-amplitude dark level line and the reference line of constant amplitude. Because the adjusted-amplitude reference signal can be considered to represent a one hundred percent transmission or reflection level, the trace provided by the proportionally adjusted amplitude sample signal can be considered to be truly representative of the percent of color transmission or reflection of the sample. It is, therefore, an object of the present invention to provide a control system which adjusts the amplitudes of signals, developed by the electronically scanned pick up of that control system in response to the spectrum of radiation from a radiation source, to provide a reference line of constant amplitude and to proportionately adjust the amplitudes of the signals developed by that electronically scanned pick up in response to the spectrum of radiation transmitted through or reflected from a sample.

The electronically scanned pick up of the control system provided by the present invention has a portion of the radiation-sensitive area thereof blocked so it receives substantially no radiation, has another portion of that radiation-sensitive area disposed to receive the spectrum from the source of radiation, and has a third portion of that radiation-sensitive area arranged to receive the spectrum of the radiation transmitted through or reflected from the sample. The electronically scanned pick up will recurrently scan each of those portions of that radiation-sensitive area to develop three signals. Those three areas will be scanned in such rapid succession that any tendency of any of the resulting three signals to drift can not affect the relative values of those signals. The signal corresponding to the blocked portion of the radiation-sensitive area will be clamped to provide the desired fixed-amplitude dark level line, the signal corresponding to the spectrum from the source of radiation will have the amplitude thereof adjusted to the desired constant-amplitude level, and the signal corresponding to the spectrum of radiation transmitted through or reflected from the sample will have the amplitude thereof adjusted proportionately. Because any tendency of any of the three signals to drift is kept from affecting the relative values of those signals, and because one of those signals is clamped and another of those signals has the amplitude thereof adjusted to a predetermined constant-amplitude level, the remaining signal will truly represent the percent of radiation transmission or reflection of the sample. It is, therefore, an object of the present invention to provide a control system that has an electronically scanned pick up which has a portion of the radiation-sensitive area thereof blocked, which has a second portion of that radiation-sensitive area arranged to receive the spectrum from a source of radiation, and which has a third portion of that radiation-sensitive area arranged to receive the spectrum of radiation transmitted through or reflected from the sample, and that clamps one of those signals and adjusts the amplitude of another of those signals to a constant-amplitude level.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purpose of illustration only and do not limit the invention and that the invention will be defined by the appended claims.

Figure 8:
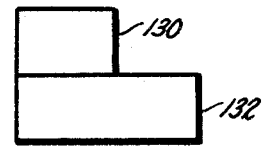
Figure 7:
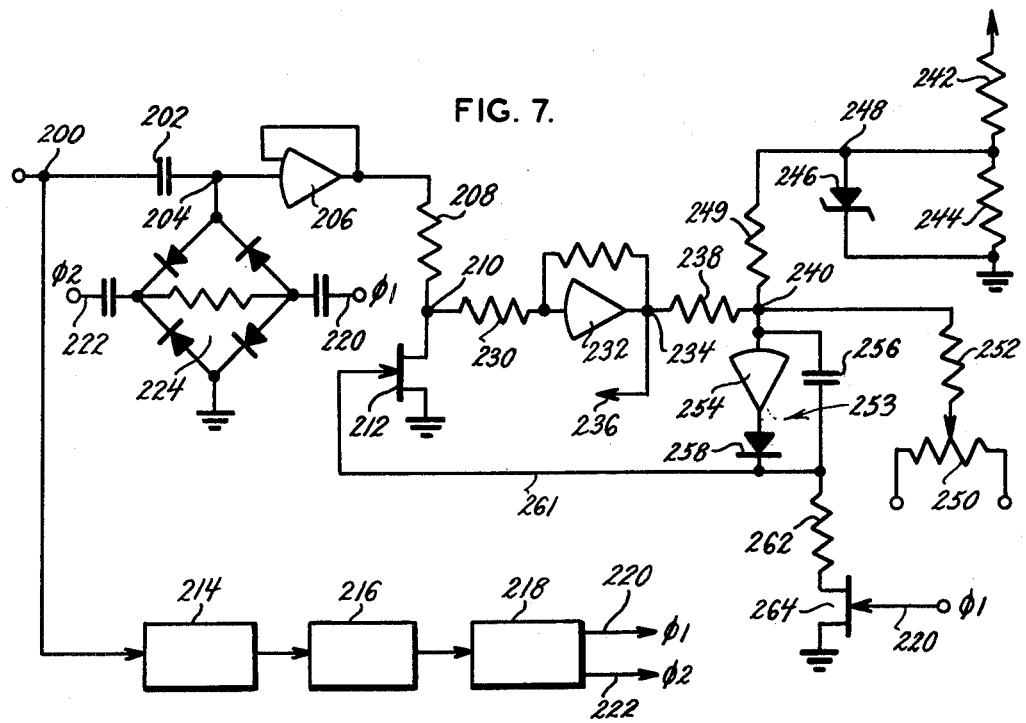
Figure 9:
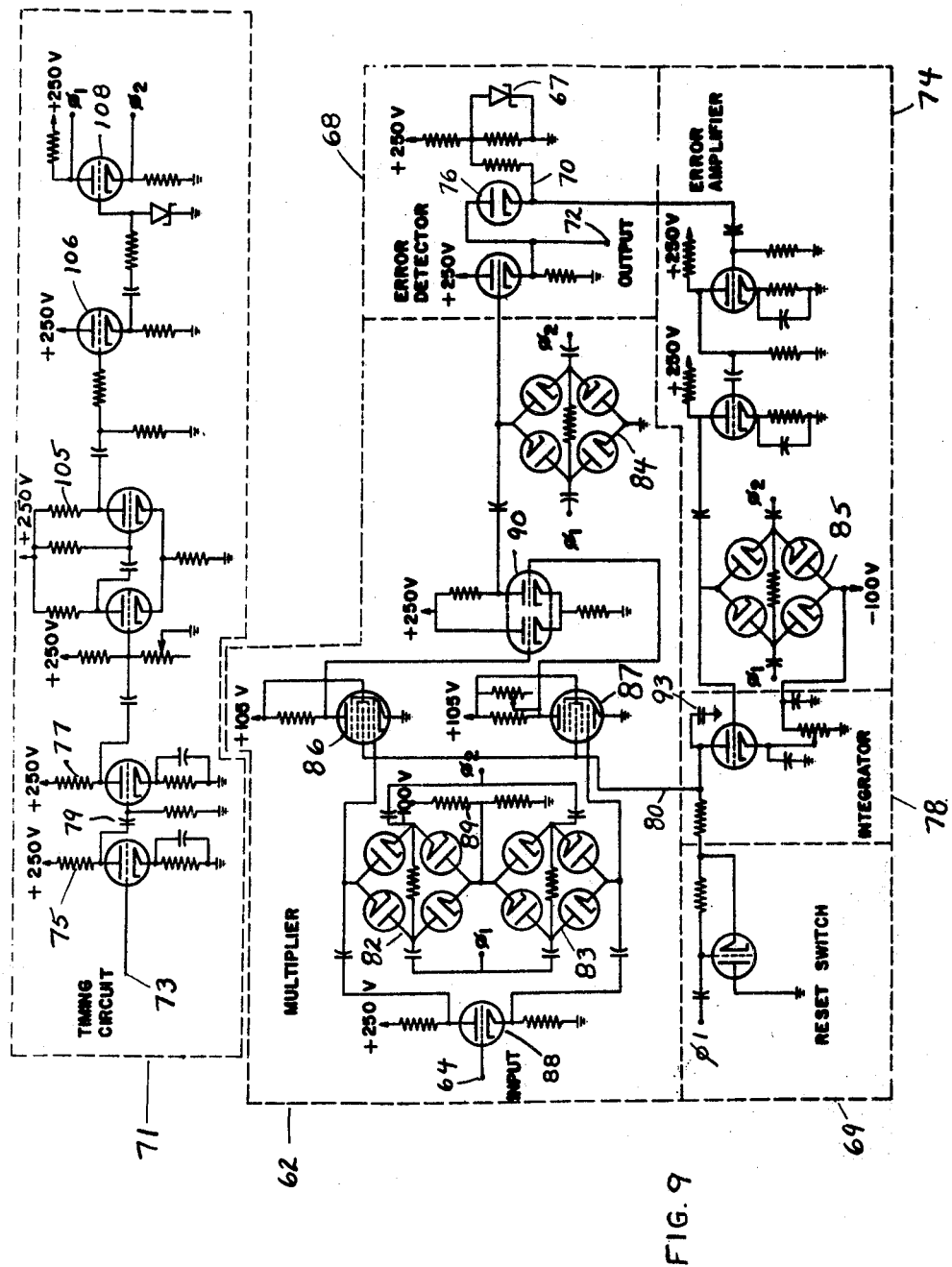

In the drawing:

FIG. 1 is a diagrammatic showing, in plan, of the spectra-forming components of one embodiment of control system provided by the present invention, FIG. 2 is a diagrammatic showing, in elevation, of the spectra-forming components shown in FIG. 1, FIG. 3 is a diagrammatic showing, on a larger scale, of a blanked out area, a first spectrum, and a second spectrum formed on the target of the vidicon shown in FIGS. 1 and 2, FIG. 4 is a representation of three electrical signals obtained during each horizontal sweep of the electron beam of the vidicon shown in FIGS. 1 and 2, FIG. 5 is a simplified block-diagram representation of one preferred embodiment of electronic circuit that can be used in the control system provided by the present invention, FIG. 6 is a representation of the face plate of a cathode ray tube which is used as the read out of the said preferred embodiment of control system provided by the present invention, FIG. 7 is a schematic diagram of another preferred embodiment of electronic circuit that can be used in the control system provided by the present invention, FIG. 8 is a schematic plan view of a reference cell and of a sample cell which could be substituted for the reference cell and the sample cell of FIGS. 1 and 2, and FIG. 9 is a schematic diagram of the electronic circuit which is shown in block-diagram form in FIG. 5.

Referring to the drawing in detail, the numeral 20 denotes a source of radiation; and one very usable source of radiation is a tungsten filament, incandescent lamp. A lens 22 receives radiation from the source 20 and focuses that radiation on a pin hole 26 in a light-impervious mask 24. A lens 28 receives the radiation passing through the pin hole 26, collimates that radiation, and directs that radiation toward a reference cell 30 and a sample cell 32 which are set in side-by-side relation. The material in the reference cell 30 has a known radiation-transmission characteristic and the material in the sample cell 32 has a radiation-transmission characteristic which is to be determined. The radiation passing through the reference cell 30 will pass to a diffraction grating 34, and the radiation passing through the sample cell 32 also will pass to that diffraction grating; and that grating will form spectra corresponding to the said radiation. A plane mirror 36 will reflect those spectra toward a cylinder lens 38; and that lens will appropriately focus those spectra on the target of a vidicon 40. The dotted lines 33 and 35 in FIG. 1 indicate the limits of the spectra focused on that target. The combination of components shown in FIGS. 1 and 2 is very useful in forming the spectra that are directed onto the target of the vidicon 40; but other combinations of those or other components could be used to provide those spectra.

As shown particularly by FIG. 3, the spectra that are directed onto the target of the vidicon 40 can consist of bands or lines 42, 44, 46, 48, 50, 52 and 54. Those bands or lines will be made to incline slightly downwardly from upper left to lower right so those bands or lines will be parallel to the horizontal sweep lines of the raster of the vidicon 40. The band 42 can be violet, the band 44 can be blue, the band 46 can be green, the band 48 can be yellow, the band 50 can be orange, the band 52 can be red, and the band 54 can be infra red. Where desired, more or fewer radiation bands can be formed on the target of the vidicon 40. A baffle 43 is interposed between part of the target of the vidicon 40 and the cylinder lens 38; and that baffle will block and blank out approximately one-third of the area of that target. As shown by FIG. 3, the blocked portion of that area will preferably be located at the left-hand side of that target; and that blocked portion will receive substantially no radiation. The spectrum of the radiation passing through the reference cell 30 will appear on the central one-third of the target of the vidicon 40; and the spectrum of the radiation passing through the sample cell 32 will appear on the right-hand one-third of the target of that vidicon.

The material in the reference cell 30 will preferably have a relatively high color transmission characteristic; and the color transmission characteristic of the material in the sample cell 32 will preferably not be higher, and usually will be lower, than that of the material in the reference cell 30. Consequently, the intensity of the radiation on the right-hand one-third of the target of the vidicon 40 will not be greater, and usually will be less, than the intensity of the radiation on the central one-third of that target. The electron beam of the vidicon 40 will move rapidly in the horizontal direction from left to right in FIG. 3 to trace generally horizontal lines; and that electron beam will be moved vertically downwardly to cause those horizontal lines to substantially cover that face plate and form a raster. As the electron beam is swept from left to right in FIG. 3, it will develop a signal of very low intensity during the first one-third of its sweep, will develop a signal of relatively high intensity during the middle one-third of that sweep, and will usually develop a signal of intermediate intensity during the last one-third of that sweep. Those signals may vary from line to line, but the signal corresponding to the first one-third of each horizontal line always will have a very low intensity, the signal corresponding to the middle one-third of that line always will have a relatively high intensity, and the signal corresponding to the last one-third of that line will usually have an intermediate intensity. The signals 92, 94 and 96 in FIG. 4 are typical of the signals which the vidicon 40 will develop during each horizontal sweep of the electron beam thereof; and the signal 92 will be developed as that electron beam moves across the left-hand one-third of the target of that vidicon, the signal 94 will be developed as that electron beam moves across the central one-third of the target of that vidicon, and the signal 96 will be developed as that electron beam moves across the right-hand one-third of the target of that vidicon.

The output of the vidicon 40 will be connected to the input of an electronic circuit; and, in the embodiment of the electronic circuit that is shown by FIGS. 5 and 9, that output is connected to the input terminal 64 of a multiplier 62. That multiplier is used as a variable gain amplifier; and the output of that multiplier is connected to the input of an error detector 68 and to an output terminal 72. The error detector 68 is shown in FIG. 5 as having a conductor 70 extending to an external constant-voltage source; but that error detector is shown in FIG. 9 as having an internal constant voltage source. An electronically scanned read out, such as a cathode ray tube, will have a face plate 98; and the input of that read out will be connected to the output terminal 72. That read out can form displays, similar to the display shown by FIG. 6, on the face plate 98 thereof; and each of those displays will have a lower reference trace, such as the trace 102, an upper reference trace, such as the trace 100, and an intermediate trace, such as the trace 104.

A diode 76 connects the output of the error detector 68 to the input of an error amplifier 74; and that diode is shown in FIG. 5 as being external of that detector and amplifier, but is shown in FIG. 9 as being within that detector. The output of the error amplifier 74 is connected to the input of an integrator 78; and a conductor 80 connects the output of that integrator to a second input of the multiplier 62.

As shown by FIG. 9, a reset switch 69 is connected to the second input of the multiplier 62; and a timing circuit 71 is provided to supply pulses to that reset switch, to the multiplier 62, and to the error amplifier 74. That timing circuit has an input 73 which will receive the synchronizing pulses for the horizontal sweeps of the vidicon 40; and those pulses will be amplified by a triode amplifier 75. The output of that amplifier is differentiated, and is coupled to the input of a triode amplifier 77, by a capacitor 79. The output of the amplifier 77 is connected to the input of a one-shot multivibrator 105; and the output of that multivibrator is connected to the input of a cathode follower 106. The output of that cathode follower is connected to the input of a paraphase amplifier 108; and that paraphase amplifier recurrently provides a positive-going square wave pulse $\phi 1$, and will also recurrently provide a negative-going square wave pulse $\phi 2$. The positive-going and negative-going square wave pulses are generated simultaneously, and they have the same duration; and those pulses are coincident, in point of time, with the signals 92 that are developed as the electron beam of the vidicon 40 scans the blocked left-hand one-third portion of the target of that vidicon. The positive-going square wave pulses $\phi 1$ will be capacitively coupled to the left-hand input terminals of diode quads 82 and 83 in the multiplier 62; and the negative-going square wave pulses $\phi 2$ will be coupled to the right-hand input terminals of those diode quads. The positive-going pulses $\phi 1$ also will be capacitively coupled to the left-hand input terminal of a diode quad 84 in the multiplier 62 and to the left-hand input terminal of a diode quad 85 in the error amplifier 74. Further, the positive-going square wave pulses $\phi 1$ will be applied to the input terminal of the reset switch 69. The negative-going square wave pulses $\phi 2$ will be capacitively coupled to the right-hand input terminals of the quads 82, 83 and 84 in the multiplier 62, and to the right-hand input terminal of the diode quad 85 of the error amplifier 74. A voltage divider 89 is connected between ground and a source of minus one hundred volts; and the tap of that voltage divider applies a constant voltage of minus four and one-half volts to the confronting terminals of the diode quads 82 and 83. As a result, those diode quads will respond to the recurrently-applied positive-going and negative-going square wave pulses $\phi 1$ and $\phi 2$ to recurrently clamp the voltages at the first grids of the pentagrids 86 and 87 at minus four and one-half volts.

Those pentagrids are parts of the multiplier 62; and the first grids of those pentagrids are capacitively coupled to the output terminals of a paraphase amplifier 88. The grid of that paraphase amplifier is directly connected to the input terminal 64 of the multiplier 62, and thus will receive signals such as the signals 92, 94 and 96 of FIG. 4. The plate of the pentagrid 86 is connected to one grid of a duotriode 90 that is connected as a differential amplifier; and the plate of the pentagrid 87 is connected to the other grid of that duotriode. The output of that differential amplifier is capacitively coupled to the control grid of a triode in the error detector 68. The diode quad 84 has the bottom terminal thereof connected to ground and has the upper terminal thereof connected to the control grid of that triode. As a result, when the positive-going and negative-going square wave pulses $\phi 1$ and $\phi 2$ are recurrently applied to the diode quad 84, the voltage at the grid of the triode of the error detector 68 will be recurrently clamped at ground level.

The triode of the error detector 68 is connected as a cathode follower; and the voltage at the cathode of that triode is connected to the output terminal 72 and also is connected to the anode of the diode 76. A Zener diode 67 and a voltage divider associated therewith are connected to the cathohde of that diode by the conductor 70; and they establish and maintain a substantially fixed plus voltage of about fifteen volts at that cathode. The quiescent voltage at the cathode of the triode of the error detector is about twelve and one-half volts; and hence the diode 76 is normally back-biased, and is thus normally non-conductive.

The cathode of the diode 76 is R-C coupled to the input of a two-stage R-C coupled triode amplifier in the error amplifier 74. The output of that two stage amplifier is coupled to the input of the triode of the integrator 78; and the plate of that triode is connected to ground by a capacitor 93 while the cathode of that triode is connected to a source of minus one hundred volts by the movable contact and upper section of a potentiometer. The diode quad 85 of the error amplifier 74 has the lower terminal thereof connected to that source of minus one hundred volts, and the upper terminal of that diode quad is connected to the grid of the triode of the integrator 78. As a result, the positive-going and negative-going square wave pulses $\phi 1$ and $\phi 2$, that are recurrently applied to the diode quad 85, will cause that diode quad to recurrently clamp the voltage at the grid of the triode of the integrator 78 at minus one hundred volts.

The conductor 80 connects the plate of the triode of the integrator 78 to the third grids of the pentagrids 86 and 87; and those third grids constitute a second input of the multiplier 62. The reset switch 69 is connected to the upper terminal of the capacitor 93; and that reset switch will recurrently respond to the positive-going pulses $\phi 1$, that are applied to the input of that reset switch, to become conductive. As that reset switch recurrently becomes conductive, it will recurrently provide a dscharging path for the voltage at the upper terminal of the capacitor 93.

The pentagrids 86 and 87 will respond to signals that are applied to the first grids thereof, and they will also respond to signals that are applied to the third grids thereof. As a result, the output voltage of each pentagrid will have two components. One of those components is dependent only upon the feedback voltage, whereas the other component is the product of that feedback voltage and the signal 94 or 96 of FIG. 4.

The signals 92, 94 and 96 of FIG. 4 will be applied to the input terminal 64 of the multiplier 62; and the paraphase amplifier 88 will respond to each of those signals to provide a positive-going and a negative-going signal— one of those signals being coupled to the first grid of the pentagrid 86 and the other of those signals being coupled to the first grid of the pentagrid 87. As the signal 92 is being applied to the input terminal 64, the positive-going and negative-going square wave pulses $\phi 1$ and $\phi 2$ will be applied to the left-hand and right-hand input terminals of the diode quads 82 and 83; and those diode quads will clamp the voltages at the first grids of the pentagrids 86 and 87 at minus four and one-half volts.

At the time the positive-going and negative-going square wave pulses $\phi 1$ and $\phi 2$ were applied to the left-hand and right-hand input terminals of the diode quads 82 and 83, to cause those diode quads to clamp the voltages at the first grids of the pentagrids 86 and 87, those positive-going and negative-going square wave pulses also caused the diode quad 84 to clamp the voltage at the grid of the triode of the error detector 68 at ground level. That clamping of that grid voltage caused the quiescent level voltage of twelve and one-half volts to appear at the cathode of that triode, and hence at the output terminal 72. The read out will respond to that quiescent voltage to form a portion of the trace 102 of FIG. 6. That trace is a fixed amplitude trace; and it constitutes a display which represents a zero level of radiation.

Also at the time the positive-going and negative-going square wave pulses $\phi 1$ and $\phi 2$ were applied to the left-hand and right-hand input terminals of the diode quads 82 and 83 and 84, those positive-going and negative-going square wave pulses caused the diode quad 85 to clamp the voltage at the grid of the triode of the integrator 78 at a voltage of minus one hundred volts. Also, the positive-going square wave pulse $\phi 1$ caused the reset switch 69 to partially discharge the capacitor 93. As a result the gain of the pentagrids 86 and 87 will initially be high.

The signal 94 will immediately follow the signal 92; and the paraphase amplifier 88 will respond to that signal to provide a positive-going signal and a negative-going signal—the negative-going signal being applied to the first grid of the pentagrid 86, and the positive-going signal being applied to the first grid of the pentagrid 87. The resulting positive-going signal at the plate of the pentagrid 86 will be applied to the left-hand grid of the duotriode 90, and the resulting negative-going signal at the plate of the pentagrid 87 will be applied to the right-hand grid of that duotriode. The resulting signal at the right-hand plate of that duotriode will be coupled to the grid of the triode of the error detector 68; and that signal will make the voltage at the cathode of that triode greater than fifteen volts. That voltage will be applied to the output terminal 72, and hence to the input of the read out; and that voltage also will be applied to the diode 76.

The resulting voltage at the cathode of that diode will be greater than the constant-value voltage provided by the Zener diode 67 and the voltage divider of the error detector 68; and the consequent error signal will be coupled to and amplified by the two-stage R-C coupled triode amplifier of the error amplifier 74. That two-stage R-C coupled triode amplifier will apply a positive-going signal to the grid of the triode of the integrator 78; and that triode will become conductive and will rapidly charge the capacitor 93 of that integrator to make the voltage at the upper terminal of that capacitor negative. The third grids of the pentagrids 86 and 87 will have that negative voltage applied to them; and that negative voltage will reduce the gain of those pentagrids, and hence will reduce the overall gain of the electronic circuit of FIG. 9. The error amplifier 74 and the integrator 78 will make the upper terminal of the capacitor 93, and hence the third grids of the pentagrids 86 and 87, more negative until the voltage at the cathode of the diode 76 falls to the fifteen volt level established by the Zener diode 67 and the voltage divider of the error detector 68.

The initial gain of the pentagrids 86 and 87 will be great enough so even a very small amplitude signal 94, that will be developed by the vidicon 40, will be large enough to enable the electronic circuit of FIGS. 5 and 9 to cause the read out to make the initial portion of the trace corresponding to that signal have an amplitude greater than that of the upper trace 100 of FIG. 6. The error detector 68, the error amplifier 74, and the integrator 78 will quickly reduce the gain of the pentagrids 86 and 87 until the amplitude of the trace corresponding to the signal 94 is equal to that of the uper trace 100. The reduction in the gain of the pentagrids will begin as soon as the signal 94 is applied to the input terminal 64 of the multiplier 62; and that reduction in gain will usually be completed within the first twenty percent of the short period of time during which that signal is applied to that input terminal. In one preferred embodiment of the present invention, that reduction in gain is usually begun and completed within five microseconds.

The voltage which a signal 94 causes the electronic circuit to initially develop at the cathode of the triode of the error detector 68 will be applied to the output terminal 72, and hence to the input of the read out. That voltage will cause that read out to start forming a trace which has an amplitude greater than that of the upper trace 100 of FIG. 6. However, within a few microseconds, the reduced overall gain of the electronic circuit will reduce the amplitude of that trace to the amplitude of the upper trace 100; and then that reduced overall gain will hold that trace at that amplitude as long as the signal 94 is applied to the input terminal 64. The duration of the higher amplitude initial portion of the trace, developed in response to a signal 94, will be so short that the trace corresponding to that portion will not be visible to the eye. Consequently, the eye will see a trace comparable to the upper trace 100 of FIG. 6.

The signal 96 will immediately follow the signal 94; and the paraphase amplifier 88 will respond to that signal to provide a negative-going signal and a positive-going signal—the positive-going signal being applied to the first grid of the pentagrid 86, and the negative-going signal being applied to the first grid of the pentagrid 87. The resulting negative-going signal at the plate of the pentagrid 86 will be applied to the left-hand grid of the duotriode 90, and the resulting positive-going signal at the plate of the pentagrid 87 will be applied to the right-hand grid of that duotriode. The resulting signal at the right-hand plate of that duotriode will be coupled to the grid of the triode of the error detector 68; and that signal will make the voltage at the cathode of that triode less than fifteen volts. That voltage will be applied to the output terminal 72, and thus to the input of the read out; and that voltage also will be applied to the diode 76. Because that voltage is less than the fifteen volts established at the cathode of the diode 76 by the Zener diode 67 and the voltage divider of the error detector 68, that diode will be back biased and will be non-conductive. This means that no signal will be applied to the error amplifier 74, and that the error amplifier 74 will not apply a signal to the integrator 78. As a result, the capacitor 93 of that integrator will not receive a further charge.

Because the reset switch 69 is non-conductive between the times when the positive-going square wave pulses $\phi 1$ are applied to the input terminal thereof, the negative charge developed in the integrator 78 will be unable to leak off. This is important; because it enables the negative voltage at the output of that integrator to continue to appear at the third grids of the pentagrids 86 and 87, and to continue to hold the gain of those pentagrids, and hence of the overall electronic circuit, at a reduced level. Consequently, during the time the signal 96 is being applied to the input terminal 64 of the multiplier 62, the gain of the pentagrids 86 and 87, and thus of the overall electronic circuit, will be the same as it was during the time the terminal portion of the signal 94 was being applied to that input terminal. This means that the voltage which the signal 96 causes to appear at the output terminal 72 will bear to the voltage which appeared at that output terminal during the terminal portion of the time when the signal 94 was being applied to the input terminal 64 the same ratio which the input signal 96 bears to the input signal 94. The cathode ray tube read out will respond to the voltage which the signal 96 causes to appear at the output terminal 72 to form a portion of the trace 104 of FIG. 6; and that portion of that trace will occupy a position, between the corresponding portions of the traces 100 and 102, which will indicate the amplitude of the signal 96 relative to the amplitudes of the signals 94 and 92.

A second signal 92 will immediately follow the signal 96; and the positive-going and negative-going square wave pulses $\phi 1$ and $\phi 2$ will be applied to the left-hand and right-hand input terminals of the diode quads 82, 83, 84 and 85, and a positive-going square wave pulse $\phi 1$ will be applied to the input terminal of the reset switch 69. Thereupon, the voltages at the first grids of the pentagrids 86 and 87 will again be clamped to minus four and one-half volts, the voltage at the grid of the triode of the error detector 68 will again be clamped to ground level, the voltage at the grid of the triode of the integrator 78 will again be clamped to minus one hundred volts, and the reset switch 69 will again be rendered conductive to partially discharge the capacitor 93. While the voltage at the grid of the triode of the error detector 68 is clamped at ground level, the voltage at the cathode of that triode, and hence at the input of the cathode ray tube read out, will be twelve and one-half volts; and that voltage will cause that read out to form part of the trace 102 of FIG. 6.

The clamping of the first grids of the pentagrids 86 and 87, the clamping of the grid of the triode of the error detector 68, and the clamping of the grid of the triode of the integrator 78 will establish D.C. voltages at those grids; and the establishing of such voltages will help fix the quiescent levels of the various signals in the electronic circuit. The fixing of those quiescent levels will completely compensate for any and all variations in the temperatures, and thus the spectral energy distribution, of the radiation source 20, for any and all variations in the ability of the vidicon 40 to sense all of the values on the various portions of the target thereof, and for any and all other variations which could tend to cause the electronic circuit to drift. The partial discharging of the capacitor 93 will again set the gain of the pentagrids 86 and 87, and thus of the overall control circuit, at a high level.

The subsequent sequential application of second signals 94 and 96 to the input terminal 64 of the amplifier 62 will set the gain of the pentagrids 86 and 87, and hence of the overall electronic circuit, at a level which will enable the voltage developed at the cathode of the triode of the error detector 68 to form a portion of the trace 100 on the face plate 98 of the read out, and also to make the corresponding portion of the trace 104 bear to the said portion of the trace 100 the same ratio which the second signal 96 bears to the second signal 94. The values of the second signals 92, 94 and 96 may, respectively, differ from the values of the first signals 92, 94 and 96, but the clamping of the grid of the triode of the error detector 68 to ground level will make the value of the display corresponding to the second signal 92 exactly equal the value of the display corresponding to the first signal 92. Also, the action of the electronic circuit in forcing the voltage at the cathode of the diode 76 to quickly fall to the value of fifteen volts will force the display corresponding to the terminal portion of the second signal 94 to have exactly the same amplitude as the display corresponding to the terminal portion of the first signal 94. The amplitude of the display corresponding to the second signal 96 can differ from the amplitude of the display corresponding to the first signal 96; but the amplitude of the display corresponding to the second signal 96 will bear to the amplitude of the display corresponding to the second signal 94 the same ratio which that second signal 96 bears to that second signal 94. The overall result is that the embodiment of control system shown by FIGS. 1, 2, 5 and 9 can compare the radiation transmissibility of the material in the sample cell 32 with the radiation transmissibility of the material in the reference cell 30, and can form a trace 102 which represents zero value of radiation transmissibility, can form a trace 100 which represents a one hundred percent value of radiation transmissibility, and can form a trace 104 which precisely and accurately indicates the radiation transmissibility, at different wave lengths, of the spectrum formed on the right-hand one-third portion of the target of the vidicon 40.

The sweep circuits of the vidicon 40 and of the cathode ray tube read out will be suitably synchronized, as by being connected to the same source of signals. As a result, each portion of the trace 104 will be displayed in the proper time sequence relative to the corresponding horizontal sweep line of the vidicon 40.

The mathematical formulae and additional details of the control system of FIGS. 1, 2, 5 and 9 are set forth in my thesis "Application of Automatic Control Theory in Design of a Null-Balance Vidicon Spectrophotometer" which has been submitted to the University of Idaho Graduate School. Some of those formulae and some of those details also are set forth in an article "A Fast-Acting Feedback Loop for Pulse Amplitude Ratio Measurement" which appeared on pages 39–46 of vol. IM–14, Numbers 1 and 2 of the March-June 1965 issue of the IEEE Transactions on Instrumentation and Measurement.

As the voltages at the third grids of the pentagrids 86 and 87 become progressively negative, each time the error detector 68 and the error amplifier 74 cause the integrator 78 to charge the capacitor 93 thereof, the quiescent levels of the output signals of those pentagrids will shift. The differential amplifier, which includes the duotriode 90, will cancel out those shifts in those quiescent levels; and this is desirable because it coacts with the periodic resetting of the various quiescent levels throughout the electronic circuit to enable each portion of the trace 104 of FIG. 6 to bear to the corresponding portion of the trace 100 the exact ratio which the signal 96 that formed the said portion of the trace 104 bears to the signal 94 which formed the said corresponding portion of the trace 100.

In most instances the radiation transmissibility of the material in the sample cell 32 will be such that the said material will develop a spectrum which is less intense, wave length per wave length, than the spectrum developed by the material in the reference cell 30. As a result, the amplitudes of all portions of the intermediate trace 104 of FIG. 6 will usually be smaller than the amplitudes of the corresponding portions of the trace 100. However, it is conceivable that a material could be placed in the reference cell 32 which would develop a spectrum that had intensities, at some or even all of the wave lengths thereof, which were equal to the intensities of the corresponding wave lengths of the spectrum provided by the material in the reference cell 30. Consequently, it should be understood that the term "intermediate trace" refers to the trace corresponding to the sample signal, and that while that trace will ordinarily be disposed between the trace 100 and the trace 102, some or all portions of that trace may be coincident with the trace 100.

The electronic circuit of FIGS. 5 and 9 uses vacuum tubes; and in one embodiment of that electronic circuit the triodes are 6SN7 tubes, the diodes are 6H6 tubes, and the pentagrids are 6L7 tubes. If desired, the electronic circuit of FIGS. 5 and 9 could be modified to enable the vacuum tubes thereof to be replaced with solid state devices.

FIG. 7 shows another preferred embodiment of electronic circuit that can be used in the control system of the present invention; and the numeral 206 in FIG. 7 denotes a P35A differential input operational amplifier made by Philbrick Researches, Inc. One of the inputs of that amplifier is connected to a junction 200 by a capacitor 202 and a junction 204; and the other input of that amplifier is connected to the output of that amplifier. The junction 200 also is connected to the input of a differentiator 214; and the output of that differentiator is connected to the input of a one-shot multivibrator 216. The output of that one-shot multivibrator is connected to the input of a paraphase amplifier 218; and a conductor 220 is connected to one of the outputs of that amplifier, and a conductor 222 is connected to the other output of that amplifier. A capacitor connects the conductor 222 to the left-hand terminal of a diode quad 224, and a second capacitor connects the conductor 220 to the right-hand terminal of that diode quad. The lower terminal of that diode quad is connected to ground; and the upper terminal of that diode quad is connected to the junction 204, and thus to the lower input of the differential input operational amplifier 206.

An electronically controlled voltage divider is connected between ground and the output of the differential input operational amplifier 206; and that electronically controlled voltage divider includes a resistor 208 and a field effect transistor 212 which are interconnected by a junction 210. That field effect transistor is a 2N2608 field effect transistor made by Siliconix, Inc.; and the source of that field effect transistor is grounded while the drain thereof is connected to the junction 210.

The input of an operational amplifier 232 is connected to the junction 210 by a resistor 230; and the output of that operational amplifier is connected to an output terminal 236 by a junction 234. The output of that operational amplifier also is connected to the input of an integrating amplifier 253 by a resistor 238 and a junction 240. That integrating amplifier includes an amplifier 254, a capacitor 256 and a diode 258. The amplifiers 232 and 254, in the preferred embodiment of electronic circuit shown in FIG. 7, are P45A amplifiers of Philbrick Researches, Inc. An electronically scanned read out, such as a cathode ray tube, will have the input thereof connected to the output terminal 236.

Resistors 242 and 244 constitute a voltage divider; and that voltage divider is connected between ground and a source of positive voltage. A Zener diode 246 is connected in parallel with the resistor 244; and that Zener diode will maintain a substantially fixed positive voltage at the junction 248, even if the voltage applied to the upper terminal of the resistor 242 varies appreciably. The junction 248 is connected to the junction 240, and thus to the input of the integrating amplifier 253, by a resistor 249. A potentiometer 250 has one fixed contact thereof connected to the positive terminal of a D.C. voltage source and has the other fixed contact thereof connected to the negative terminal of that voltage source. The movable contact of that potentiometer is connected to the input of the integrating amplifier 253 by a resistor 252 and the junction 240. That movable contact will be adjusted to provide a desired value of offset current for the integrating amplifier 253.

The output of the integrating amplifier 253 is connected to the gate of the field effect transistor 212 by a conductor 261; and that output and the lower terminal of the capacitor 256 are connectable to ground by a resistor 262 and the source-to-drain circuit of a field effect transistor 264. That field effect transistor also is a 2N2608 field effect transistor made by Siliconix, Inc.; and the gate of that field effect transistor is connected to the conductor 220.

The junction 200 in FIG. 7 will be connected to the output of the vidicon 40 of FIGS. 1 and 2—preferably through an R-C coupled amplifier—and hence signals such as the signals 92, 94 and 96 of FIG. 4 will be applied to that junction. The differentiator 214 will respond to each signal 94 to provide a positive-going spike, and will respond to the signals 96 and 92 to provide two negative-going spikes. The one-shot multivibrator 216 will respond to the positive-going spike provided by the differentiator 214 to form a positive-going square wave. The paraphase amplifier 218 will respond to that positive-going square wave to form a positive-going square wave pulse $\phi 1$ and a negative-going square wave pulse $\phi 2$; and that paraphase amplifier will apply the positive-going square wave pulse $\phi 1$ to the conductor 220 and will apply the negative-going square wave pulse $\phi 2$ to the conductor 222. The positive-going and negative-going square wave pulses $\phi 1$ and $\phi 2$ will be coincident, in point of time, with the signal 92 of FIG. 4.

When the signal 92 of FIG. 4 is applied to the junction 200, the paraphase amplifier 218 will apply a positive-going square wave pulse $\phi 1$ to the gate of the field effect transistor 264 and to the right-hand input terminal of the diode quad 224, and that amplifier will apply a negative-going square wave pulse $\phi 2$ to the left-hand input terminal of that diode quad. Those pulses will cause that field effect transistor to ground the lower terminal of the capacitor 256, and will cause that diode quad to ground the junction 204. The resulting discharging of the capacitor 256 will set the gain of the integrating amplifier 253 at a high level, and will increase the resistance of the field effect transistor 212; and the grounding of the junction 204 will clamp the voltage at the lower input terminal of the differential input operational amplifier 206 at ground level.

The differential input operational amplifier 206 serves as a voltage follower, and it is used for isolation purposes. As a result, when the voltage at the lower input terminal of that differential input operational amplifier is clamped at ground level, the voltage across the series-connected resistor 208 and field effect transistor 212 will essentially be zero. The operational amplifier 232 will respond to the resulting, essentially zero voltage at the junction 210 to provide a voltage at the junction 234 which is less than the substantially fixed positive voltage which the Zener diode 246 maintains at the junction 248; and the cathode ray tube read out connected to the output terminal 236 will respond to that voltage to form a portion of the trace 102 on the face plate 98 thereof. That trace will represent zero radiation value.

The signal 94 will immediately follow the signal 92; but when the signal 94 is applied to the junction 200, the diode quad 224 will not be clamping the voltage at the lower input of the differential input operational amplifier 206 at ground level. As a result, a positive voltage will appear at that lower input, and the differential input operational amplifier 206 will respond to that voltage to provide a positive voltage at the upper terminal of the resistor 208. The consequent positive voltage at the junction 210 will be applied to the input of the operational amplifier 232; and that operational amplifier will respond to that positive voltage to provide a negative-going voltage at the junction 234, and hence at the output terminal 236. That voltage will be larger in magnitude than the substantially fixed voltage which the Zener diode 246 maintains at the junction 240. The read out will respond to that voltage to start to form a trace on the face plate 98 thereof which has an amplitude greater than that of the trace 100 of FIG. 6; and the integrating amplifier 253 will respond to that voltage to start charging the capacitor 256 thereof—with the voltage at the lower terminal of that capacitor positive. Because that capacitor was partially discharged while the signal 92 of FIG. 4 was being applied to the junction 200, the output of the integrating amplifier 253 will initially be high.

The positive voltage at the lower terminal of capacitor 256 will be applied to the gate of field effect transistor 212; and the resulting decrease in resistance of that field effect transistor will reduce the voltage appearing at junction 210. The value of the voltage at that junction will quickly fall to a level which will enable the operational amplifier 232 to make the magnitude of the voltage at junction 234 equal to that of the voltage which the Zener diode 246 establishes at the latter junction. The read out will respond to the decreased voltage at the output terminal 236 to cause the amplitude of the trace corresponding to the terminal portion of the pulse 94 to equal the amplitude of the trace 100—which trace represents a one hundred percent reference level. The electronic circuit of FIG. 7 will set the resistance of the field effect transistor 212, and hence the ratio between the output and input of that electronic circuit, during the first portion of the time period in which the signal 94 is applied to the junction 200. Preferably, that electronic circuit will set that resistance and that ratio during the first twenty percent of that time period; and, where that is done, the higher amplitude trace formed on the face plate 98 during that twenty percent of that time period will not be visible to the eye.

The signal 96 will immediately follow the signal 94; and, again, the diode quad 224 will not be clamping the voltage at the lower input of the differential input operational amplifier 206 at ground level. As a result, a positive voltage will appear at that lower input; and that differential input operational amplifier will respond to that voltage to provide a positive voltage at the upper terminal of the resistor 208. The consequent voltage at the junction 210 will be applied to the input of the operational amplifier 232, and that operational amplifier will respond to that voltage to provide a voltage at the junction 234. If, as will usually be the case, the voltage which the operational amplifier 232 provides at the junction 234 is less than the voltage which the Zener diode 246 establishes at that junction, the diode 258 will keep the integrating amplifier 253 from further charging the capacitor 256; and hence the positive voltage at the lower terminal of that capacitor will continue to hold the resistance of the field effect transistor 212 at the level which it had during the terminal portion of the time period when the signal 94 was being applied to the junction 200. The lesser voltage which the signal 96 will cause the electronic circuit of FIG. 7 to develop at the junction 234, and thus at the output terminal 236, will cause the read out to form a portion of the trace 104 of FIG. 6.

When the electronic circuit of FIG. 7 responded to the voltage developed at the junction 234, in response to the initial portion of the signal 94, to change the resistance of the field effect transistor 212, that electronic circuit set the ratio between the output and input thereof. When that electronic circuit subsequently maintained that resistance and that ratio unchanged, while the signal 96 was being applied to the junction 200, that electronic circuit caused the trace corresponding to the signal 96 to bear to the terminal portion of the trace corresponding to the signal 94 the same ratio which the signal 96 bears to the signal 94.

A second signal 92 will immediately follow the signal 96; and, when that second signal 92 is applied to the junction 200, the differentiator 214, the one-shot multivibrator 216, and the paraphase 218 will again cause the diode quad 224 to clamp the voltage at the lower input of the differential input operational amplifier 206 at ground level, and will again partially discharge the capacitor 256—thereby re-setting the resistance of the field effect transistor 212 at a high value.

The subsequent sequential application of second signals 94 and 96 to the junction 200 will set the resistance of the field effect transistor 212, and will thus set the ratio between the output and input of the electronic circuit of FIG. 7, at levels which will enable the voltage developed at the junction 234 to form a portion of the trace 100 on the face plate 98 of the read out, and also to make the corresponding portion of the trace 104 bear to the said portion of the trace 100 the same ratio which the second signal 96 bears to the second signal 94. The values of the second signals 92, 94 and 96 may, respectively, differ from the values of the first signals 92, 94 and 96; but the clamping of the lower input of the differential input operational amplifier 206 to ground level will make the value of the display corresponding to the second signal 92 exactly equal the value of the display corresponding to the first signal 92. Also, the action of the electronic circuit in forcing the voltage at the junction 234 to quickly fall to the value which the Zener diode 246 maintains at that junction will force the display corresponding to the terminal portion of the second signal 94 to have exactly the same amplitude as the display corresponding to the terminal portion of the first signal 94. The amplitude of the display corresponding to the second signal 96 can differ from the amplitude of the display corresponding to the first signal 96; but the amplitude of the display corresponding to the second signal 96 will bear to the amplitude of the display corresponding to the second signal 94 the same ratio which that second signal 96 bears to that second signal 94. The overall result is that the embodiment of control system shown by FIGS. 1, 2 and 7 can compare the radiation transmissibility of the material in the sample cell 32 with the radiation transmissibility of the material in the reference cell 30, and can form a trace 102 which represents zero value of radiation transmissibility, can form a trace 100 which represents a one hundred percent value of radiation transmissibility, and can form a trace 104 which precisely and accurately indicates the radiation transmissibility, at different wave lengths, of the spectrum formed on the right-hand one-third portion of the target of the vidicon 40.

The pulses $\phi 1$ and $\phi 2$ which are produced by the timing circuit 71 of FIG. 9, and the pulses $\phi 1$ and $\phi 2$ which are produced by the differentiator 214, the multivibrator 216 and the amplifier 218 of FIG. 7, have configurations that generally resemble those of square wave pulses. However, because the durations of the pulses $\phi 1$ and $\phi 2$ are very short, those pulses will usually not be true square wave pulses. Instead, those pulses will be rectangular pulses with positive-going and negative-going portions of unequal durations.

The use of a vidicon as the electronically scanned pickup of the control system provided by the present invention enables that control system to respond to even very low levels of radiation. This is due, in part, to the fact that a vidicon is a sensitive pickup; but it also is due to the fact that the radiation transfer characteristic of a vidicon is less than unity. For example, the radiation transfer characteristic of a 7735–A vidicon is fifty-six hundredths. With such a radiation transfer characteristic, the output of the vidicon 40 is equal to the ratio of the intensities of radiation on the right-hand and central one-third portions of the target of the vidicon raised to the fifty six hundredths power. As a result, the vidicon 40 will provide an effective gain in signal-to-noise ratio without loss of resolution for any low levels of radiation sensed on the right-hand and central one-third portions of the target thereof. The mathematical analysis of the radiation transfer characteristic of a vidicon is spelled out more fully in my said thesis.

In many instances, the non-linear radiation transfer characteristic of the vidicon 40 is desirable; because that radiation transfer characteristic provides an increase in signal-to-noise ratio without loss of resolution for any low levels of radiation. However, in some instances, it may be desirable to provide or to simulate a radiation transfer characteristic of unity. While an electronic circuit could be devised to simulate a radiation transfer characteristic of unity, such a radiation transfer characteristic can easily and simply be simulated by making the length of the radiation path through the material in the sample cell differ from the length of the radiation path through the material in the reference cell. Specifically, as shown by FIG. 8, if the material in a sample cell 132 has a lower radiation transmissibility than the material in the reference cell 130, a radiation transfer characteristic of unity can be simulated by making the radiation path through the material in the sample cell 132 longer than the radiation path through the material in a reference cell 130. If the radiation transfer characteristic of the vidicon 40 is fifty six hundredths, the length of the radiation path through the material in the sample cell 132 should be approximately one and eight tenths times as long as the length of the radiation path through the reference cell 130.

The control system provided by the present invention is importantly useful in the art of spectrophotometry. That control system can, by appropriate selection of the electronically scanned pickup thereof, be made capable of sensing any desired type of radiation. That control system is very useful in sensing radiation in the visible spectrum, in the infra red spectrum, and in the ultraviolet spectrum; and that control system can be used to sense radiation in any spectrum which can be sensed by an electronically scanned pickup.

The control system provided by the present invention is not limited to use in the field of spectrophotometry; and, instead, can be used in any field in which the ratio of two or more values is to be determined. For example, that control system would be very useful in the telemetering field, and would be very useful in the calibrating field. In those two fields, the input signals would be transducer signals rather than signals provided by an electronically scanned pickup.

In the operation of the portion of the control system shown in FIGS. 1 and 2, a signal 94 corresponding to a reference material and a signal 96 corresponding to a sample material are developed. However, the control system provided by the present invention is not limited to the developing of just one sample signal; and, instead, that control system can develop any desired number of sample signals. Further, that control system can provide displays which correspond to those sample signals and which bear to the one hundred percent display trace 100 the ratios which those sample signals bear to the reference signal 94. All that need be done is to replace the sample cell 32 with a plurality of sample cells that are disposed in side by side relation.

The multiplier 62 of the electronic circuit of FIGS. 5 and 9 is preferably a wide band width, variable gain amplifier. In one preferred embodiment of that electronic circuit, the multiplier 62 has a band width of one megacycle.

The control system provided by the present invention successively senses the blocked area of the vidicon target, the area of that target which corresponds to the reference spectrum, and the area of that target which corresponds to the sample spectrum. Such a sequence of sensing is very desirable where the radiation transmissibility of the sample is less than the radiation transmissibility of the reference; because it enables the electronically scanned pickup to produce a reference signal which is larger than the sample signal and which can be used to fix the ratio, between the output and the input of the electronic circuit, at a desired level throughout the time periods when the terminal portion of the reference signal and the sample signal are applied to the input of that electronic circuit.

The electronic circuit of FIGS. 5 and 9 uses the multiplier 62 as an electronically variable means to set the ratio of the output and input of that electronic circuit; and the electronic circuit of FIG. 7 uses the electronically variable voltage divider composed of the resistor 208 and the field effect transistor 212 as such an electronically variable means. Other electronically controlled components and subcircuits also could be used as such an electronically controlled means. For example, a function multiplier which makes the output voltage thereof proportional to the product of two input voltages could be used as such an electronically controlled means.

The electronically scanned pickup of FIGS. 1 and 2 develops serial data, and the electronic circuits of FIGS. 5 and 9 and of FIG. 7 serially sense that data to form the zero reference trace 102, the one hundred percent reference trace 100, and the intermediate trace 104 of FIG. 6. If desired, the serial data deveeloped by the pickup of FIGS. 1 and 2 could be converted into parallel data by sample and hold circuits of the type disclosed on page 90 of the book "Digital Techniques for Computation and Control" by M. L. Klein, H. C. Morgan and M. H. Aronson. That parallel data could then be fed into a dividing circuit, of the type disclosed on page 53 of the book "Analog Computation" by A. S. Jackson; and that dividing circuit could provide the signals needed to form the zero reference trace 102, the one hundred percent reference trace 100, and the intermediate trace 104 of FIG. 6. That dividing circuit would serve as an electronically variable means to set the ratio of the output and input of the electronic circuit used in the sample and hold control system.

A cathode ray tube is a very useful read out for the control system of the present invention; but other read outs could be used. For example, a magnetic tape, a punched tape, an inked tape, or the graph or record of a recorder could be used as that read out. Also, a suitable memory for digital information could be used as that read out, and then that digital information could be subsequently utilized.

In the electronic circuit of FIG. 9, the integrator 78 is used as a "memory" to maintain and hold the overall gain level which is established for that electronic circuit during the initial portion of the time period when the signal 94 is being applied to the input terminal 64 of the multiplier 62. In the electronic circuit of FIG. 7, the integrating amplifier 253 serves as a "memory" to maintain and hold the ratio, between the output and the input, which is established for that electronic circuit during the initial portion of the time period when the signal 94 is being applied to the junction 200. The use of those integrators as the "memories" for those electronic circuits is important, because those integrators can readily have the charges on the capacitors thereof increased to establish the desired ratios between the outputs and inputs of those electronic circuits. Also, those integrators can readily have portions of the charges in the capacitors thereof dissipated to permit quick re-setting of those ratios.

In the embodiments of sampled data control systems disclosed herein, three radiation values are actively sensed by the same pickup to develop three interrelated signals. Those interrelated signals are then actively used to cause a read out to form three displays which correspond to those three radiation values. As a result, those embodiments of sampled data control systems can provide simple, direct and accurate displays of the ratios between desired characteristics of a sample, a lower reference, and an upper reference.

In the embodiments of sampled data control systems disclosed herein, the signals corresponding to zero level are clamped and the signals corresponding to a one hundred percent level have the amplitudes thereof adjusted to a predetermined, fixed level. If desired, the signals corresponding to a one hundred percent level could be clamped and the signals corresponding to zero level could have the amplitudes thereof adjusted to a predetermined, fixed level. In such event, the signals corresponding to the sample would have the amplitudes thereof adjusted so the displays corresponding to those sample signals would bear to the displays corresponding to the zero level signals the same ratio which those sample signals bear to those zero level signals.

In the embodiments of sampled data control systems disclosed herein, the electronic circuits decrease the values of the signals corresponding to the one hundred percent level, and then proportionately decrease the values of the signals corresponding to the sample. However, if desired, electronic circuits could be provided for those embodiments of sampled data control systems which would increase the values of the signals corresponding to the one hundred percent level, and then proportionately increase the values of the signals corresponding to the sample.

The electron beam of the vidicon 40 senses just one wave length per spectrum during each horizontal sweep of that electron beam. The next horizontal sweep of that electron beam will sense a different wave length of each spectrum; and hence the display corresponding to each horizontal sweep of that electron beam must be precise and accurate. Because the electronic circuits of the embodiments of sampled data control systems shown and described herein keep the quiescent levels of the signals, obtained from the vidicon 40, fixed, the displays corresponding to those signals are precise and accurate.

The vidicon 40 shown and described herein is a very useful and desirable pickup, but other pickups could be used. If desired, a photoresistive cell or a photomultiplier could be associated with a suitable mechano-optical system that would recurrently direct three values of radiation onto that photoresistive cell or photomultiplier. The signals that were developed by such a pickup could then be applied to the inputs of the electronic circuits of FIGS. 5 and 9 and FIG. 7.

The displaying of the traces 100, 102 and 104 on the face plate 98 of the read out is important; because it permits immediate and accurate calibrating of the trace 104. The displaying of those traces on that face plate also is important; because the absence or obvious aberration of any of those traces would indicate that a component of the sampled data control system was defective or was not operating properly.

Whereas the drawing and accompanying description have shown and described two preferred embodiments of the present invention it should be apparent to those skilled in the art that various changes may be made in the form of the invention without affecting the scope thereof.

What I claim is:

1. A control system which comprises:
   (a) a pickup with a radiation-sensitive area,
   (b) one portion of said radiation-sensitive area of said pickup receiving one value of radiation,
   (c) a second portion of said radiation-sensitive area of said pickup receiving a second value of radiation,
   (d) a third portion of said radiation-sensitive area of said pickup receiving a third value of radiation,
   (e) said pickup sensing said one value of radiation to provide one signal,
   (f) said pickup sensing said second value of radiation to provide a second signal,
   (g) said pickup sensing said third value of radiation to provide a third signal,
   (h) said pickup sensing said one value of radiation, said second value of radiation, and said third value of radiation during three individually-different portions of a short period of time,
   (i) a read out that can provide individually-different displays corresponding to said one, said second, and said third values of radiation, and
   (j) an electronic circuit that receives said one, said second, and said third signals and that causes said read out to provide said displays corresponding to said one, said second, and said third values of radiation,
   (k) said electronic circuit having a sub-circuit that develops a predetermined substantially-fixed voltage, during the portion of said short period of time when said pickup is sensing said one value of radiation, and that applies said predetermined substantially-fixed voltage to said read out to cause said display corresponding to said one value of radiation to be a substantially-fixed display of predetermined value,
   (l) said sub-circuit not applying said predetermined substantially-fixed voltage to said read out during those portions of said short period of time when said pickup is sensing said second value of radiation and said third value of radiation, whereby said read out can provide displays during those portions of said short period of time when said pickup is sensing said second value of radiation and said third value of radiation which are distinctively different from said substantially-fixed display of predetermined value, (m) said electronic circuit having a second sub-circuit that develops a second predetermined substantially-fixed voltage, distinctively different from the first said predetermined substantially-fixed voltage, during the portion of said short period of time when said pickup is sensing said second value of radiation, and that applies said second predetermined substantially-fixed voltage to said read out to cause said display corresponding to said second value of radiation to be a substantially-fixed display of a second predetermined value which is distinctively different from said display corresponding to said one value of radiation, (n) said electronic circuit initially tending to respond to said second signal to apply a third voltage to said read out which would cause said display corresponding to said second value of radiation to have a value different from said second predetermined substantially-fixed value, but said second sub-circuit rapidly changing said third voltage until it is substantially equal to said second predetermined substantially-fixed voltage, (o) said electronic circuit having a third sub-circuit that senses and remember the ratio which said third voltage bore to said second predetermined substantially-fixed voltage, (p) said third sub-circuit of said electronic circuit responding to said third signal to develop a fourth voltage that causes said display corresponding to said third value of radiation to bear to said display corresponding to said second value of radiation substantially the same ratio which said third voltage bore to said second predetermined substantially-fixed voltage, (q) the value of said display corresponding to said third value of radiation being intermediate the value of said display corresponding to said one value of radiation and the value of said display corresponding to said second value of radiation.

2. A control system as claimed in claim 1 wherein the first said sub-circuit includes a clamping section that clamps a voltage within said first said sub-circuit to a fixed reference voltage and thereby enables said first said sub-circuit to develop the first said predetermined substantially-fixed voltage, and wherein said one value of radiation is substantially zero so said display corresponding to said one value of radiation constitutes an essentially zero value reference.

3. A control system as claimed in claim 1 wherein said one value of radiation is substantially zero so said display corresponding to said one value of radiation constitutes an essentially zero value reference, wherein said display corresponding to said second value of radiation can be used as an essentially one hundred percent value reference, and wherein the position of said display corresponding to said third value of radiation relative to the positions of the other two displays directly indicates the ratio which said third value of radiation bears to said second value of radiation.

4. A control system as claimed in claim 1 wherein said pickup senses said one, said second, and said third values of radiation a plurality of times every second and wherein the first said sub-circuit utilizes the first said predetermined substantially-fixed voltage to fix said display corresponding to said one value of radiation and said second sub-circuit utilizes said second predetermined substantially-fixed voltage to fix said display corresponding to said second value of radiation and said third sub-circuit develops said fourth voltage to provide said display corresponding to said third value of radiation a plurality of times every second, thereby eliminating errors caused by gradual changes in said second and said third values of radiation due to drift.

5. A control system as claimed in claim 1 wherein a baffle is in register with said one portion of said radiation-sensitive area of said pickup to make said one value of radiation substantially zero, wherein a reference directs radiation onto said second portion of said radiation-sensitive area of said pickup to make said second value of radiation serve as a reference, and wherein a sample directs radiation onto said third portion of said radiation-sensitive area of said pickup.

6. A control system which comprises:
(a) a pickup with a radiation-sensitive area,
(b) one portion of said radiation-sensitive area of said pickup receiving one value of radiation,
(c) a second portion of said radiation-sensitive area of said pickup receiving a second value of radiation,
(d) a third portion of said radiation-sensitive area of said pickup receiving a third value of radiation,
(e) said pickup sensing said one value of radiation to provide one signal,
(f) said pickup sensing said second value of radiation to provide a second signal,
(g) said pickup sensing said third value of radiation to provide a third signal,
(h) an electronic circuit that receives said one, said second, and said third signals and that causes said read out to provide said displays corresponding to said one, said second, and said third values of radiation,
(i) said electronic circuit having a sub-circuit that develops a predetermined substantially-fixed voltage, during the portion of said short period of time when said pickup is sensing said one value of radiation, and that applies said predetermined substantially-fixed voltage to said read out to cause said display corresponding to said one value of radiation to be a substantially-fixed display of predetermined value,
(j) said electronic circuit having a second sub-circuit that develops a second predetermined substantially-fixed voltage, distinctively different from the first said predetermined substantially-fixed voltage, during the portion of said short period of time when said pickup is sensing said second value of radiation, and that applies said second predetermined substantially-fixed voltage to said read out to cause said display corresponding to said second value of radiation to be a substantially-fixed display of a second predetermined value which is distinctively different from said display corresponding to said one value of radiation,
(k) said electronic circuit initially tending to respond to said second signal to apply a third voltage to said read out which would cause said display corresponding to said second value of radiation to have a value different from said second predetermined substantially-fixed value, but said second sub-circuit rapidly changing said third voltage until it is substantially equal to said second predetermined substantially-fixed voltage,
(l) said electronic circuit having a third sub-circuit that senses and remembers the ratio which said third voltage bore to said second predetermined substantially-fixed voltage,
(m) said third sub-circuit of said electronic circuit responding to said third signal to develop a fourth voltage that causes said display corresponding to said third value of radiation to bear to said display corresponding to said second value of radiation substantially the same ratio which said third voltage bore to said second predetermined substantially-fixed voltage,
(n) said one value of radiation being substantially zero, said second value of radiation being considered to substantially represent one hundred percent, and said third value of radiation corresponding to a sample, and (o) said pickup recurrently sensing said one, said second, and said third values of radiation in that sequence, (p) whereby said third sub-circuit can remember said ratio which said third voltage bore to said second predetermined substantially-fixed voltage and can respond to said third signal to develop said fourth voltage, (q) said read out recurrently providing a substantially zero value display, a display corresponding to one hundred percent, and a display which is intermediate said substantially zero value display and said display corresponding to one hundred percent.

7. A control system that comprises:

(a) a terminal to which input signals can be applied, (b) a second terminal to which a predetermined substantially-fixed voltage can be applied, (c) a third terminal at which output signals will appear, and (d) an electronic circuit which includes an electronically variable means that responds to the application of a given input signal to the first said terminal to adjust the ratio between the output and input of said electronic circuit to a value which will make the output signal, that appears at said third terminal because of said given input signal, substantially-fixed relative to said predetermined substantially-fixed voltage applied to said second terminal, (e) said electronic circuit thereafter holding said ratio, between the output and input of said electronic circuit, at said value while a second input signal is subsequently applied to the first said terminal, (f) said electronic circuit responding to said subsequently applied second input signal to provide a second output signal which is subsequent in point of time to the first said output signal and which bears to said second input signal said ratio between said output and input of said electronic circuit, (g) said electronic circuit thereafter re-setting itself to enable it to respond to a further given input signal to adjust the ratio, between said output and input of said electronic circuit, to a value which will make the further output signal, that appears at said third terminal because of said further given input signal, substantially-fixed relative to said predetermined substantially-fixed voltage applied to said second terminal, (h) whereby the given and input signals of each pair of given and second input signals will receive the same ratioing from said electronic circuit, but whereby the ratioing given different pairs of given and second input signals can be different.

8. A control system as claimed in claim 7 wherein said given input signal applied to said input terminal is larger than or equal to said second input signal, said electronic circuit causing said second output signal to be smaller than said first said output signal where said second input signal is smaller than said given input signal and causing said second output signal to be equal to said first said output signal where said second input signal is equal to said given input signal, whereby said electronic circuit causes said second output signal to bear to said first said output signal substantially the same ratio which said second input signal bears to said given input signal.

9. A control system as claimed in claim 7 wherein said electronic circuit has a closed loop that uses feedback to adjust the closed loop gain of said electronic circuit and thereby adjust said ratio of output to input of said electronic circuit, and wherein said second input signal is equal to or smaller than said given input signal, whereby said closed loop can respond to said given input signal to change said closed loop gain but cannot respond to said second input signal to change said closed loop gain so said closed loop can maintain the closed loop gain thereof fixed during the time said second input signal is applied to said first said terminal.

10. A control system that comprises:

(a) a terminal to which input signals can be applied, (b) a second terminal to which a predetermined substantially-fixed voltage can be applied, (c) a third terminal at which output signals will appear, and (d) an electronic circuit which includes an electronically variable means that responds to the application of a given input signal to the first said terminal to adjust the ratio between the output and input of said electronic circuit to a value which will make the output signal, that appears at said third terminal because of said given input signal, substantially-fixed relative to said predetermined substantially-fixed voltage applied to said second terminal, (e) said electronic circuit thereafter holding said ratio, between the output and input of said electronic circuit, at said value while a second input signal is subsequently applied to the first said terminal, (f) said electronic circuit responding to said subsequently-applied second input signal to provide a second output signal which is subsequent in point of time to the first said output signal and which bears to said second input signal said ratio between said output and input of said electronic circuit, (g) said electronic circuit thereafter re-setting itself to enable it to respond to a further given input signal to adjust the ratio, between said output and input of said electronic circuit, to a value which will make the further output signal, that appears at said third terminal because of said further given input signal, substantially-fixed relative to said predetermined substantially-fixed voltage applied to said second terminal, (h) whereby the given and input signals of each pair of given and second input signals will receive the same ratioing from said electronic circuit, but whereby the ratioing given different pairs of given and second input signals can be different, (i) said electronically variable means including a wide band width variable gain amplifier which rapidly varies the gain of said electronic circuit to provide said ratio between said output and input of said electronic circuit when said given input signal is applied to the first said terminal, (j) said wide band width variable gain amplifier holding said gain of said electronic circuit fixed while said second input signal is applied to said first said terminal, (k) said electronic circuit including a re-setting circuit, (l) said re-setting circuit coacting with said wide band width variable gain amplifier to re-set the gain of said electronic circuit to a fixed, predetermined value at the conclusion of the period of time during which said second input signal is being applied to said first said terminal.

11. A control system which comprises:

(a) a pickup that senses three separate values to provide three separate signals, (b) a read out that provides three separate displays corresponding to said three separate signals, and (c) an electronic circuit that receives said three separate signals and causes said read out to provide said three separate displays, (d) said electronic circuit having sub-circuits causing two of said displays to have voltage-fixed amplitudes, (e) said electronic circuit having a further sub-circuit causing the third display to bear to one of said two displays the ratio which the signal corresponding to said third display bears to the signal corresponding to said one of said two displays.

12. A control system as claimed in claim 11 wherein said further sub-circuit of said electronic circuit includes an electrically variable means to adjust and fix the ratio between the output and input of said electronic circuit while said signal corresponding to said one of said two displays is applied to said electronic circuit, said electronically variable means thereafter holding said ratio fixed during the time said signal corresponding to said third display is applied to said electronic circuit.

13. A control system as claimed in claim 11 wherein said pickup scans said three values consecutively to make said three signals consecutive, and wherein the value to which said one of said two displays corresponds immediately precedes the value to which said third display corresponds, whereby said further sub-circuit of said electronic circuit can keep said ratio unchanged during the time between the conclusion of the forming of said one of said two displays and the start of the forming of said third display, said read out forming said displays corresponding to said three signals so said displays are displayed substantially simultaneously.

14. A control system as claimed in claim 11 wherein said further sub-circuit of said electronic circuit includes an electronically adjustable voltage divider to adjust and fix the ratio between the output and input of said electronic circuit while said signal corresponding to said one of said two displays is applied to said electronic circuit, said electronically adjustable voltage divider thereafter holding said ratio fixed while said signal corresponding to said third display is applied to said electronic circuit.

15. A control system which comprises:
(a) a radiation-sensitive pickup,
(b) a baffle disposed to keep substantially all radiation from falling on a predetermined portion of said radiation-sensitive pickup,
(c) a reference which can receive radiation and permit said radiation to pass to a second portion of said radiation-sensitive pickup,
(d) said radiation-sensitive pickup having a third portion thereof that is adapted to receive radiation from a sample,
(e) said radiation-sensitive pickup sensing the intensities of radiation on said three portions thereof and providing signals corresponding to said intensities,
(f) a read out that responds to said signals to provide indicia representing the intensities of radiation on said three portions of said radiation-sensitive pickup,
(g) means to hold the display, corresponding to the radiation intensity on the first said portion, constant so said display can serve as a zero level,
(h) further means making the display, corresponding to the radiation intensity on said second portion, constant and displaced from said display corresponding to the radiation intensity on said first said portion so said display, corresponding to the radiation intensity on said second portion, can serve as a fixed reference level, and
(i) additional means making the display, corresponding to the radiation intensity on said third portion, bear to said display corresponding to the radiation intensity on said second portion the same ratio which the signal, corresponding to the radiation intensity on said third portion, bears to the signal corresponding to the radiation intensity on said second portion,
(j) said display corresponding to the radiation intensity on said third portion of said radiation-sensitive pickup being displaced from said zero level.

16. A control system as claimed in claim 7 wherein a radiation-sensitive pickup is disposed to receive radiation and is connected to the first said terminal to supply input signals to said first said terminal, said radiation-sensitive pickup having a radiation transfer characteristic other than unity to provide a desired signal-to-noise ratio at low radiation levels without loss of resolution.

17. A control system that comprises:
(a) a radiation-sensitive pickup,
(b) a reference cell that has a path through which radiation can pass to said radiation-sensitive pickup,
(c) a sample cell that has a path through which radiation can pass to said radiation-sensitive pickup,
(d) a read out, and
(e) an electronic circuit that receives signals from said pickup and that causes said read out to provide a display corresponding to said signals,
(f) said radiation-sensitive pickup having a radiation transfer characteristic other than unity,
(g) said path for radiation through said sample cell having a length different from that of said path for radiation through said reference cell to compensate, at least in part, for said other-than-unity radiation transfer characteristic of said radiation-sensitive pickup.

18. A control system as claimed in claim 7 wherein said electronically variable means of said electronic circuit includes an integrator, said electronically variable means of said electronic circuit responding to said given input signal to establish a voltage at the output of said integrator, and using said voltage to control said ratio between said output and said input of said electronic circuit, said integrator maintaining said voltage and thereby serving as a "memory" until said electronic circuit resets itself.

19. A control system as claimed in claim 11 wherein one of said subcircuits of said electronic circuit includes an electronically variable means and a closed feedback loop to cause one of said two displays to have said voltage fixed amplitude, another of said sub-circuits of said electronic circuit including a clamping circuit to cause the other of said two displays to have said voltage fixed amplitude.

References Cited

UNITED STATES PATENTS 2,240,722  5/1941  Snow _____ 250—226 XR
3,257,562  6/1966  Erdman et al.

JEWELL H. PEDERSEN, Primary Examiner

ORVILLE B. CHEW II, Assistant Examiner

U.S. Cl. X.R.

250—226; 324—140; 356—206, 212